(12) United States Patent
Amer et al.

(10) Patent No.: US 12,716,604 B2
(45) Date of Patent: Aug. 25, 2026

(54) INTEGRATED HVAC CONTROL SYSTEM FOR HYBRID HVAC SYSTEMS HAVING DUCTED AND/OR DUCTLESS HVAC SYSTEMS

(71) Applicant: DiversiTech Corporation, Duluth, GA (US)

(72) Inventors: Waseem Amer, Islamabad (PK); Anees Ahmed Jarral, Islamabad (PK); Syeda Farwa Batool, Rawalpindi (PK); Umair Nawaz Khan, Rawalpindi (PK); Aftab Farooqi, Redmond, WA (US)

(73) Assignee: DiversiTech Corporation, Duluth, GA (US)

( * ) Notice: Subject to any disclaimer, the term of this patent is extended or adjusted under 35 U.S.C. 154(b) by 537 days.

(21) Appl. No.: 18/193,576

(22) Filed: Mar. 30, 2023

(65) Prior Publication Data

US 2023/0314029 A1 Oct. 5, 2023

Related U.S. Application Data

(63) Continuation of application No. 17/512,622, filed on Oct. 27, 2021, now Pat. No. 11,802,709, and a continuation-in-part of application No. 17/512,629, filed on Oct. 27, 2021, now Pat. No. 11,821,643.

(60) Provisional application No. 63/483,221, filed on Feb. 3, 2023.

(51) Int. Cl.

*F24F 11/56* (2018.01)
*F24F 11/58* (2018.01)
*F24F 11/63* (2018.01)
*G05B 19/042* (2006.01)
*F24F 110/10* (2018.01)
*F24F 110/20* (2018.01)

(52) U.S. Cl.

CPC .............. *F24F 11/56* (2018.01); *F24F 11/58* (2018.01); *F24F 11/63* (2018.01); *G05B 19/042* (2013.01); *F24F 2110/10* (2018.01); *F24F 2110/20* (2018.01); *G05B 2219/2614* (2013.01)

(58) Field of Classification Search

CPC .. F24F 11/56; F24F 11/58; F24F 11/63; F24F 2110/10; F24F 2110/20; F24F 11/46; F24F 11/006; F24F 11/30; G05B 19/042; G05B 2219/2614; G05B 15/02

See application file for complete search history.

(56) References Cited

U.S. PATENT DOCUMENTS

2016/0070244 A1* 3/2016 Cipollo .................. G05B 15/02 700/275
2016/0092847 A1* 3/2016 Buchbinder ....... G06Q 30/0635 705/26.8
2017/0146261 A1* 5/2017 Rogers ..................... F24F 11/62
2019/0179610 A1* 6/2019 Aiken ................. H04L 12/2829
2023/0112157 A1* 4/2023 Rigney ..................... F24H 4/04 122/13.01
2024/0377092 A1* 11/2024 Horton ..................... F24F 11/65

* cited by examiner

*Primary Examiner* — Alicia M. Choi
(74) *Attorney, Agent, or Firm* — Dentons US LLP

(57) ABSTRACT

A system and method for a single integrated control solution for ducted and ductless HVAC systems which seamlessly connects the ductless and ducted HVAC units coming from various brands, with no restriction in what brand or HVAC unit the consumers use. The integrated control solution can control all of the units automatically based on settings established or selected by the user, and can be as simple or complex as the user desires.

16 Claims, 9 Drawing Sheets

Processors 21

Memory 25

OSes 22

Storage 26

Services 23

Outputs 27

Clients 24

Inputs 28

INTEGRATED HVAC CONTROL SYSTEM FOR HYBRID HVAC SYSTEMS HAVING DUCTED AND/OR DUCTLESS HVAC SYSTEMS

CROSS-REFERENCE TO RELATED APPLICATIONS

Priority is claimed in the application data sheet to the following patents or patent applications, each of which is expressly incorporated herein by reference in its entirety:

63/483,221

Ser. No. 17/512,629

Ser. No. 17/512,622

BACKGROUND OF THE INVENTION

Field of the Art

The present invention is in the field of control systems for heating and air conditioning systems.

Discussion of the State of the Art

When it comes to comfortable climate control inside homes, most homeowners are confused by the variety of HVAC systems coming from different brands and manufacturers. There is a vast variety of ductless and ducted HVAC units. Comfort in compact places can be easily maintained by a single ductless unit which saves installation cost and energy costs in the long run. But huge buildings like Offices and malls mostly need central units to maintain a comfortable indoor climate. The solution depends on the building size and the needs of consumers. As consumers target comfort and energy saving simultaneously, a hybrid solution comprising both ductless and/or ducted systems can be effective for climate control at locations with multiple stories or multiple comfort zone requirements, but such hybrid systems currently lack any sort of comprehensive or coordinated controls. With all the various devices available, be it ducted, ductless, or hybrid, controlling the units of different brands and maintaining comfort with reduced energy consumption can easily become troublesome.

What is needed is a single integrated control solution for ducted and ductless HVAC systems.

SUMMARY OF THE INVENTION

Accordingly, the inventor has conceived and reduced to practice, a system and method for a single integrated control solution for ducted and ductless HVAC systems which seamlessly connects the ductless and ducted HVAC units coming from various brands, with no restriction in what brand or HVAC unit the consumers use. The integrated control solution can control all of the units automatically based on settings established or selected by the user, and can be as simple or complex as the user desires.

According to a preferred embodiment, a system for controlling hybrid heating, ventilation, and air conditioning (HVAC) systems is disclosed, comprising: a plurality of smart devices, each comprising a memory, a processor, and a network interface, and each configured to control an HVAC unit of a hybrid HVAC system; a software application comprising a plurality of programming instructions stored in the memories of, and operating on the processors of, each smart device which: causes a first smart device of the plurality of smart devices to: receive, via the network interface, an activation condition and an action to be taken by a second smart device of the plurality of smart devices upon occurrence of the activation condition; store the activation condition and action in its memory; monitor for occurrence of the activation condition and, upon detection of the occurrence of the activation condition, send, via the network interface, instructions for the second smart device to take the action; and causes the second smart device of the plurality of smart devices to: receive, via the network interface, instructions from the first smart device to take the action; and take the action instructed by the first smart device.

According to a preferred embodiment, a method for controlling hybrid heating, ventilation, and air conditioning (HVAC) systems is disclosed, comprising the steps of: operating a plurality of smart devices, each comprising a memory, a processor, and a network interface, and each configured to control an HVAC unit of a hybrid HVAC system; using a software application comprising a plurality of programming instructions stored in the memories of, and operating on the processors of, each smart device to perform the steps of: causing a first smart device of the plurality of smart devices to: receive, via the network interface, an activation condition and an action to be taken by a second smart device of the plurality of smart devices upon occurrence of the activation condition; store the activation condition and action in its memory; monitor for occurrence of the activation condition and, upon detection of the occurrence of the activation condition, send, via the network interface, instructions for the second smart device to take the action; and causing the second smart device of the plurality of smart devices to: receive, via the network interface, instructions from the first smart device to take the action; and take the action instructed by the first smart device.

According to an aspect of an embodiment, the first smart device and second smart device are directly connected via their respective network interfaces, and wherein the instructions for the second smart device to take the action are sent directly between the two devices via the direct connection.

According to an aspect of an embodiment, the first smart device and second smart device are connected via their respective network interfaces to the Internet, and wherein the instructions for the second smart device to take the action are sent between the two devices via the Internet.

According to an aspect of an embodiment, a cloud-based control platform is accessible via the Internet, wherein: the first smart device and second smart device each have a connection, via their respective network interfaces, to the cloud-based control platform via the Internet; the cloud-based control platform transmits to the first device, via the Internet, the activation condition and the action to be taken by the second smart device; the first smart device, upon detection of the occurrence of the activation condition sends to the cloud-based control platform the instructions for the second smart device to take the action; and the cloud-based control platform sends to the second smart device the instructions for the second smart device to take the action.

According to an aspect of an embodiment, the software application further comprises a second action to be taken by the first smart device which has detected the occurrence of the activation condition, and wherein the first smart device takes the second action.

According to an aspect of an embodiment, the first smart device receives, via its network interface, the activation condition and action from a mobile computing device.

According to an aspect of an embodiment, the first smart device receives, via its network interface, the activation condition and action from the Internet.

According to an aspect of an embodiment, the first smart device receives, via its network interface, the activation condition and action from a cloud-based control platform accessible via the Internet.

BRIEF DESCRIPTION OF THE DRAWING FIGURES

FIG. 9 is a block diagram illustrating an exemplary logical architecture for a client device.

DETAILED DESCRIPTION OF THE DRAWING FIGURES

Figure 1:
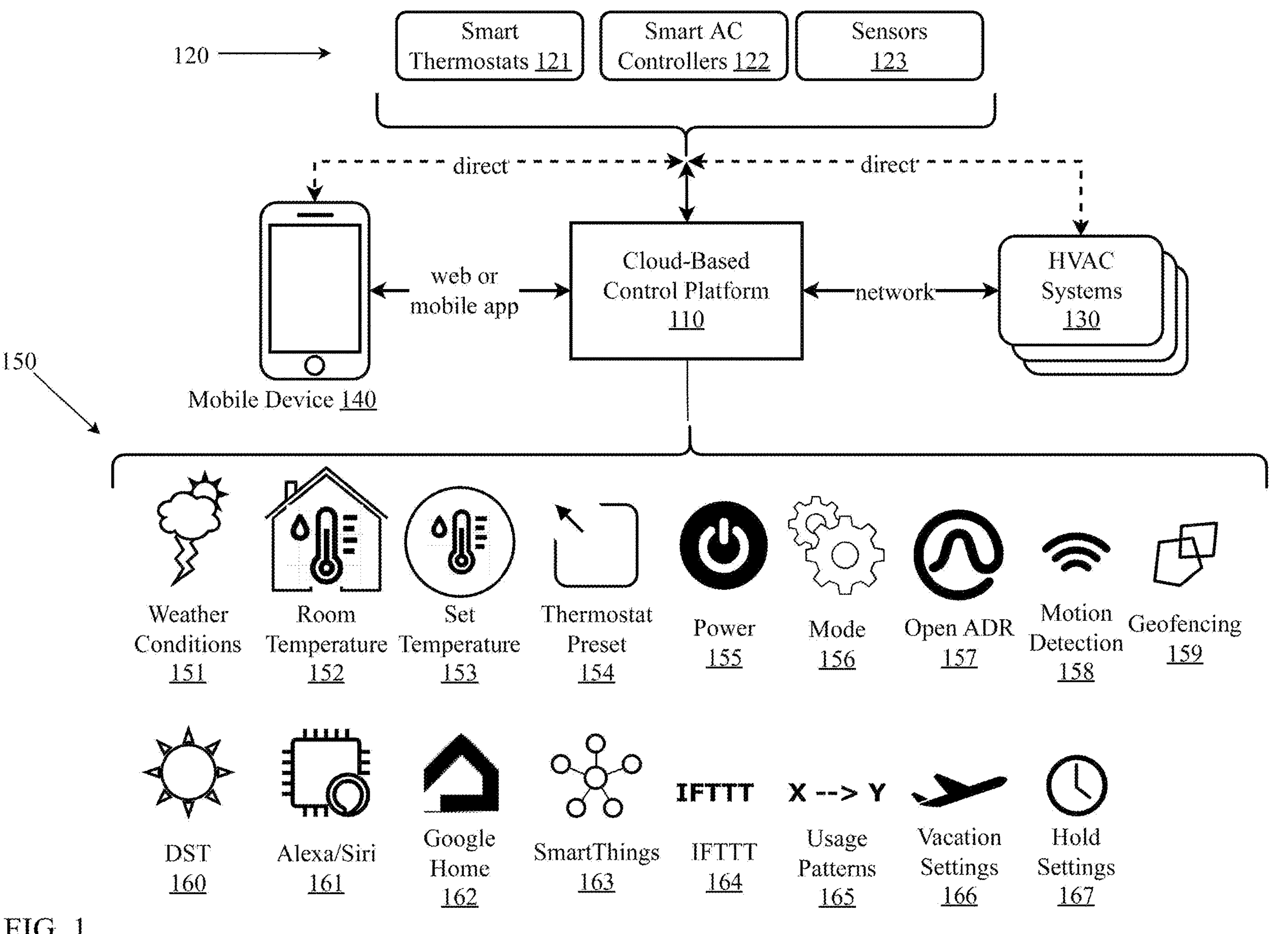
FIG. 1 is a block diagram illustrating an exemplary system architecture for single integrated control solution for hybrid HVAC systems.

The inventor has conceived, and reduced to practice, a system and method for a single integrated control solution for ducted and ductless HVAC systems which seamlessly connects the ductless and ducted HVAC units coming from various brands, with no restriction in what brand or HVAC unit the consumers use. The integrated control solution can control all of the units automatically based on settings established or selected by the user, and can be as simple or complex as the user desires.

There are two major types of heating, ventilation, and air conditioning (HVAC) systems, ducted systems (also known as centralized systems) which heat and/or cool multiple rooms in a building using a single HVAC system which supplies air to the various rooms via air ducts, and ductless systems (examples of which are mini-splits, window units, and portable units) which are installed in a single room and heat and/or cool only that room. Ducted and ductless HVAC systems have different types of controllers and are unable to coordinate with one another, even if installed in the same building. Ductless HVAC systems are designed to operate as individual units, so cannot coordinate their operation either with a ducted HVAC system or with each other. Ducted HVAC systems are not designed to coordinate their operation with ductless HVAC systems. So, where a hybrid HVAC system comprised of a combination of ducted and/or ductless HVAC systems is installed in a building, there is no means of coordinating the operation of the various HVAC systems. They all operate independently of one another, resulting in a lack of efficiency, higher energy costs, and more difficulty in operation for the owner or user. The single integrated control solution described herein solves this problem by providing a means for coordinating the operation of the various HVAC systems through one or more smart devices; including smart thermostats, smart AC controllers, and sensors, each of which can be programmed with certain operating rules and conditions which, taken together, result in coordinated control of a hybrid HVAC system with as little or as much complexity as the user desires.

In an embodiment, a system for controlling hybrid heating, ventilation, and air conditioning (HVAC) systems comprises: a plurality of smart devices including smart thermostats, Smart AC controllers and smart sensors, each comprising a memory, a processor, and a wireless/network interface; Wi-Fi, BLE or RF, wherein:—this is where we need to adjust the writeup of this patent to 3 main variations within in—Only Ducted systems, Ducted and Ductless Systems, Only Ductless Systems (as mentioned in my email—Farwa has changed the writeup below as per my email—please check in detail—and let's see if you can send us the final draft by tomorrow—if you have any questions, you can email Farwa or even have a Zoom meeting with her). system and is configured to control the operation of the ducted HVAC system via the wired connection; or at least one AC controller of the plurality of smart devices has a wireless transmitter and is configured to control the operation of a ductless HVAC unit via the wireless transmitter; or one smart sensor of the plurality of smart devices has wireless connection to other plurality of smart devices and/or Cloud to report back latest updates, via the wireless/network interface; and at least one another smart thermostat of the plurality of smart devices has a wired connection to a ducted HVAC system and is configured to control the operation of the ducted HVAC system via the wired connection; or at least one another AC controller of the plurality of smart devices has a wireless transmitter and is configured to control the operation of a ductless HVAC unit via the wireless transmitter; and a cloud based service accessible via internet which serves as a communication medium between devices and apps and may store, process and operate instructions, depending on situation; a software application comprising a plurality of programming instructions, depending on situation, stored and processed on cloud or stored in the memories of, and operating on the processors of, each smart device which; if instructions are stored on smart device; causes a first smart thermostat or AC controller or smart sensor of the plurality of smart devices to: receive, via the wireless/network interface, an activation condition and an action to be taken by a second smart thermostat or AC controller of the plurality of smart devices upon occurrence of the activation condition; store the activation condition and action in its memory; monitor for occurrence of the activation condition and, upon detection of the occurrence of the activation condition, send, via the wireless/network interface, instructions for the second smart thermostat or AC controller to take the action; and causes the second smart thermostat or AC controller of the plurality of smart devices to: receive, via the wireless/network interface, instructions from the first smart thermostat or AC controller to take the action; and take the action instructed by the first smart thermostat or AC controller; if instructions are stored on cloud, causes the Cloud service to: receive, via the internet, an activation condition and an action to be taken by a second smart thermostat or AC controller of the plurality of smart devices upon occurrence of the activation condition; store the activation condition and action in Cloud database; monitor for occurrence of the activation condition on Cloud and, upon detection of the occurrence of the activation condition, send, via the wireless/network interface, instructions for the second smart thermostat or AC controller to take the action; and causes the second smart thermostat or AC controller of the plurality of smart devices to: receive, via the wireless/network interface, instructions from the cloud service to take the action; and take the action instructed by the cloud.

In another embodiment, a method for controlling hybrid heating, ventilation, and air conditioning (HVAC) systems comprises the steps of: operating a plurality of smart devices including smart thermostats, AC controllers and smart sensors, each comprising a memory, a processor, and a wireless/network interface; Wi-Fi, BLE or RF, wherein: at least one smart thermostat of the plurality of smart devices has a wired connection to a ducted HVAC system and is configured to control the operation of the ducted HVAC system via the wired connection; or at least one AC controller of the plurality of smart devices has a wireless transmitter and is configured to control the operation of a ductless HVAC unit via the wireless transmitter; or one smart sensor of the plurality of smart devices has wireless connection to other plurality of smart devices and/or Cloud to report back latest updates, via the wireless/network interface; and at least one another smart thermostat of the plurality of smart devices has a wired connection to a ducted HVAC system and is configured to control the operation of the ducted HVAC system via the wired connection; or at least one another AC controller of the plurality of smart devices has a wireless transmitter and is configured to control the operation of a ductless HVAC unit via the wireless transmitter; and a cloud based service accessible via internet which serves as a communication medium between devices and apps and may store, process and operate instructions, depending on situation; and a software application comprising a plurality of programming instructions, depending on situation; stored and processed on cloud or stored in the memories of, and operating on the processors of, each smart device which; if instructions are stored on smart device; causes a first smart thermostat or AC controller or smart sensor of the plurality of smart devices to: receive, via the wireless/network interface, an activation condition and an action to be taken by a second smart thermostat or AC controller of the plurality of smart devices upon occurrence of the activation condition; store the activation condition and action in its memory; monitor for occurrence of the activation condition and, upon detection of the occurrence of the activation condition, send, via the wireless/network interface, instructions for the second smart thermostat or AC controller to take the action; and causes the second smart thermostat or AC controller of the plurality of smart devices to: receive, via the wireless/network interface, instructions from the first smart thermostat or AC controller to take the action; and take the action instructed by the first smart thermostat or AC controller. If instructions are stored on cloud, causes the Cloud service to: receive, via the internet, an activation condition and an action to be taken by a second smart thermostat or AC controller of the plurality of smart devices upon occurrence of the activation condition; store the activation condition and action in Cloud database; monitor for occurrence of the activation condition on Cloud and, upon detection of the occurrence of the activation condition, send, via the wireless/network interface, instructions for the second smart thermostat or AC controller to take the action; and causes the second smart thermostat or AC controller of the plurality of smart devices to: receive, via the wireless/network interface, instructions from the cloud service to take the action; and take the action instructed by the cloud service.

In an aspect of an embodiment, the first smart device and second smart device may be directly connected via their respective wireless/network interfaces; Wi-Fi, BLE, RF, and wherein the instructions for the second smart device to take the action are, in this case, sent directly between the two thermostats via the direct connection.

In an aspect of an embodiment, the first smart device and second smart device may not have a direct connection, wherein the instructions for the second smart device to take the action are sent to second smart device by cloud service.

In an aspect of an embodiment, the software application and the smart devices are connected to cloud platform via internet and the instructions from application to first smart device are sent via cloud platform.

In an aspect of an embodiment, a cloud-based control platform accessible via the Internet is used, wherein: the software application and the first smart device and second smart device each have a connection, via their respective wireless/network interfaces, to the cloud-based control platform via the Internet; If the instructions are to be stored on first smart device, the software application sends instructions for the activation condition and the action to be taken by the second smart device to the first smart device via cloud platform; the first smart device, upon detection of the occurrence of the activation condition sends to the cloud-based control platform the instructions for the second smart thermostat to take the action; and the cloud-based control platform sends to the second smart thermostat the instructions for the second smart thermostat to take the action; or the first smart device may directly send the instructions to the second smart device; If the instructions are to be stored on cloud, the software application sends the instructions for activation condition and the action to be taken by second smart device, to the cloud service; the cloud service stores the instructions in the cloud DB and upon detection of the occurrence of the activation condition sends the action to be taken by the second smart device to the second smart device.

In an aspect of an embodiment, the software application further comprises a second action to be taken by the first smart thermostat which has detected the occurrence of the activation condition, and wherein the first smart thermostat takes the second action. The software application can be installed and operated on a mobile device in the form of a mobile application and can also be accessed via web browsers using the web app link hosted on a web server.

In an aspect of an embodiment, the first smart thermostat receives, via its wireless/network interface, the activation condition and action from a mobile computing device.

In an aspect of an embodiment, the first smart thermostat receives, via its wireless/network interface, the activation condition and action from the Internet.

In an aspect of an embodiment, the first smart thermostat receives, via its wireless/network interface, the activation condition and action from a cloud-based control platform accessible via the Internet.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

"Action" as used herein means some change in operation of a device triggered by an activation condition. An action may be triggered by the device itself or by another device.

"Activation condition" as used herein means a logical condition which, if met, triggers performance of an action on linked devices.

"Activation condition types" as used herein means types of condition factors like weather, room temp, a certain action on triggering device etc.

"HVAC system" as used herein means a collection of components and devices configured to heat, cool, and/or ventilate an enclosed space.

"HVAC unit" as used herein means either a portion of an HVAC system (e.g., the central heater of a ducted system) or a single instance of an HVAC system (such as a ductless HVAC system), depending on its usage in context.

"Hybrid HVAC system" means a plurality of HVAC units.

"Link" or "linked" as used herein means a communication connection between devices wherein one device can receive data from, transfer data to, or trigger an action on, another device, either directly or via a network such as the Internet.

"Link cardinality" as used herein means the number of devices and conditional factors involved in the link. A non-exhaustive list of potential link cardinalities includes an activation condition on a single device impacting a single device, an activation condition on a single device impacting multiple devices, and multiple activation conditions on a single device impacting one or more devices (e.g., if the room temp rises above a certain point on a first device, power off two other devices), and activation conditions on multiple devices impacting a single device (e.g., a threshold temperature that must be reached on two devices to change the operation of a third device). Link cardinality complexity is theoretically unlimited, and additional link cardinality complexity can be created by combining in series or in parallel the link cardinality types listed above.

"Linked devices" as used herein means devices that are linked for purposes of operating any portion of an HVAC device or HVAC system.

"Smart device" as used herein means any device capable of being configured as a linked device including, but not limited to, smart thermostats, smart AC controllers, and network-connected sensors.

"Smart thermostat" as used herein means a thermostat capable of being configured as a linked device and configured to control a ducted HVAC system via industry-standard HVAC control wiring. While a distinction between smart thermostats and smart AC controllers is made herein for purposes of clarity in identifying control of ducted or ductless HVAC systems, these definitions are not meant to be limiting for purposes of patentability. The functionality of both smart thermostats and smart AC controllers is similar, and either can be configured to control either ducted or ductless systems, either wired or wirelessly (including configurations using infrared signals as the wireless control).

"Smart AC controller" as used herein means a thermostat capable of being configured as a linked device and configured to control a ductless HVAC system wirelessly (either via radio frequency communications such as Bluetooth and Wi-Fi, or the more common infrared signals). While a distinction between smart thermostats and smart AC controllers is made herein for purposes of clarity in identifying control of ducted or ductless HVAC systems, these definitions are not meant to be limiting for purposes of patentability. The functionality of both smart thermostats and smart AC controllers is similar, and either can be configured to control either ducted or ductless systems, either wired or wirelessly (including configurations using infrared signals as the wireless control).

"Triggering device" as used herein means a device that initiates an action depending on an activation condition.

DETAILED DESCRIPTIONS OF DRAWINGS

FIG. 1 is a block diagram illustrating an exemplary system architecture for single integrated control solution for hybrid HVAC systems. In this example, the single integrated control solution comprises a cloud-based control platform 110, one or more smart devices 120 including, but not limited to, smart thermostats 121, AC controllers 122 and smart sensors 123 which control one or more HVAC systems 130, and a mobile device 140 or other computing device with a software which allows for configuration of the single integrated control solution based on a variety of activation conditions 150.

Cloud-based control platform 110 is accessible via a suitable network (e.g., the Internet, WAN, LAN, etc.) to mobile devices 140 or other computing devices, smart devices 120 including, but not limited to, smart thermostats 122, smart AC controllers 122, smart sensors 123, and in some configurations, directly to HVAC systems 130 (where such devices contain networking hardware and capabilities). Cloud-based control platform 110 provides centralization and coordination of smart devices 120 including, but not limited to, smart thermostats 122, smart AC controllers 122, smart sensors 123, HVAC systems 130, and mobile device 140 or other computing device, storing links and activation conditions, receiving triggers from any triggering devices, and instructing linked devices to implement link actions based on triggers. Cloud-based control platform 110 allows remote operation by virtue of its being accessible via a network. For example, mobile device 140 can control or operate smart devices 120 including, but not limited to, smart thermostats 122, smart AC controllers 122, smart sensors 123 or establish links and activation conditions from anywhere in the world via the Internet. As another example, smart thermostats 121, smart AC controllers 122 can operate HVAC systems 130 remotely even where there is no direct connection to HVAC systems 130, as long as both smart devices including smart thermostats 121, smart AC controllers 122 and HVAC systems 130 both have a network connection (e.g., via the Internet) to cloud-based control platform).

Smart thermostats 121 and smart AC controllers 122 Smart thermostats 121 and smart AC controllers 122 are HVAC controllers configurable with links and activation conditions to form a network of condition-controlled HVAC systems 130. Links may be between any combination of cloud-based platform 110, HVAC systems 130, other smart devices 120 including, but not limited to, smart thermostats 122, smart AC controllers 122, smart sensors 123 and mobile devices 140 or other computing devices. Smart thermostats 120 may be configured to control an HVAC system via traditional HVAC wiring (i.e., with wires for controlling the power and various subsystems of a ducted HVAC system such as Rc, G, Y, W, and OB wires) or may control an HVAC system wirelessly (e.g., by transmitting coded infrared (IR) signals mimicking those emitted by standard IR controllers for ductless HVAC units or, where such technology is available via Bluetooth, Wi-Fi, or other wireless technologies). Smart thermostats 121, smart AC controllers 122 and smart sensors 122 may communicate with one another directly or via cloud-based control platform, via wireless/network interfaces including Wi-Fi, BLE or RF.

HVAC systems 130 may be of any type or configuration (ducted, ductless, or any combination thereof), but in this example it is assumed that there exists a hybrid HVAC system comprised of at least one ductless HVAC unit and one ducted HVAC unit). There are two major types of HVAC systems, ducted systems (also known as centralized systems) which heat and/or cool multiple rooms in a building using a single HVAC system which supplies air to the various rooms via air ducts, and ductless systems (examples of which are mini-splits, window units, and portable units) which are installed in a single room and heat and/or cool only that room. Ducted and ductless HVAC systems have different types of controllers and are unable to coordinate with one another, even if installed in the same building. Ductless HVAC systems are designed to operate as individual units, so cannot coordinate their operation either with a ducted HVAC system or with each other. Ducted HVAC systems are not designed to coordinate their operation with ductless HVAC systems. So, where a hybrid HVAC system comprised of a combination of ducted and ductless HVAC systems is installed in a building, there is no means of coordinating the operation of the various HVAC systems. They all operate independently of one another, resulting in a lack of efficiency, higher energy costs, and more difficulty in operation for the owner or user. The single integrated control solution described herein solves this problem by providing a means for coordinating the operation of the various HVAC systems through one or more smart devices 120, each of which can be programmed with certain activation conditions 150 which, taken together, result in coordinated control of a hybrid HVAC system with as little or as much complexity as the user desires.

Mobile device 140 may be a mobile phone, smart phone, tablet computer, or any other computing device (whether or not mobile), which is capable of operating software or web application to operate smart devices 120 including, but not limited to, smart thermostats 122, smart AC controllers 122, smart sensors 123, HVAC devices 130, or to configure activation conditions therefor. Mobile device 140 may have network connections with cloud-based control platform 110, smart devices 120 such as smart thermostats 121, smart AC controllers 122, smart sensors 123, HVAC systems 130 (where network-capable), or any combination thereof.

Activation conditions 150 may be of numerous types, a non-exhaustive list of which includes weather conditions 151, room temperatures 152, temperature set-points 153, applying a certain preset on smart devices 120 and other settings 154, power settings 155 including but not limited to a device's on/off status and a current operating power level of a device, OpenADR™ triggers 157, and changes in smart thermostat presets and other settings due to; motion detection 158, geofence changes 159, change in daylight savings time (DST) of any device 160, any predefined action from virtual assistants such as Alexa™ and Siri™ 161, Google Home™ 162, Smartthings™ 163, IFTTT™ 164, daily/weekly/monthly usage reaching a certain level 165, Vacation settings 166, hold settings 167, and modes 156 which are pre-configured or selectable groups of activation conditions programmed for a particular purpose. Some non-limiting examples of possible modes 156 are a "freeze-protection" mode which keeps a building at a certain minimum temperature to prevent freezing of water pipes, a "maximum efficiency" mode for a warehouse which operates only HVAC devices in the hottest areas of a building at the minimum power necessary to prevent damage to contents within the warehouse, and a "comfort" mode which keeps temperatures at a comfortable level even at the expense of additional power consumption.

Figure 2:
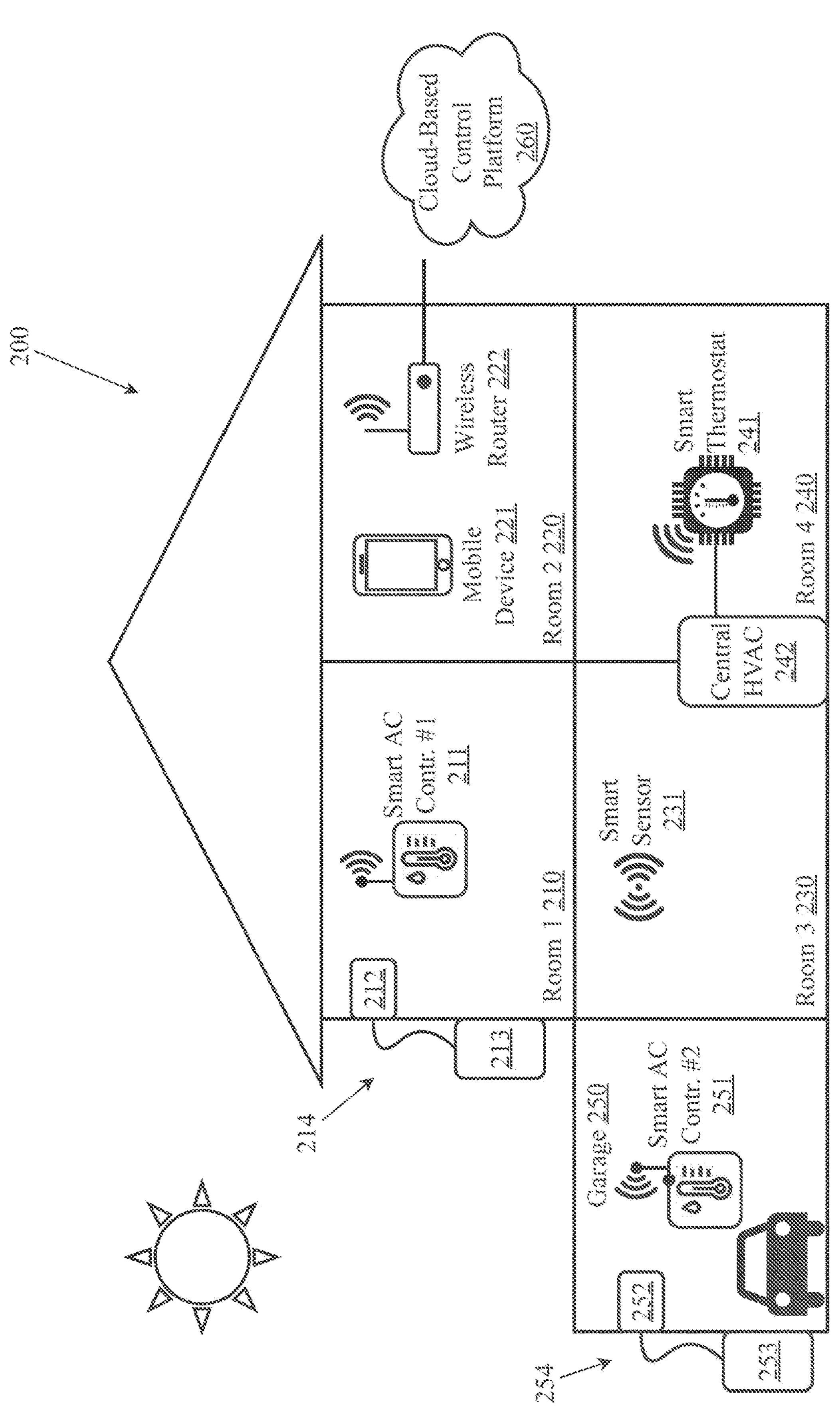
FIG. 2 is a diagram illustrating an exemplary installation of a hybrid HVAC system with multiple smart controllers.

FIG. 2 is a diagram illustrating an exemplary installation of a hybrid HVAC system with multiple smart controllers. In this example, a home 200 is shown comprising four rooms and a garage. Home 200 has a hybrid HVAC system comprising a central (ducted) HVAC system 242 with ducting to each of the four rooms and two mini-split (ductless) HVAC units 214, 254. A plurality of smart AC controllers 211, 251, a smart sensor 231, a smart thermostat 241, a mobile device 221, a wireless router 212, and a cloud-based control platform 260 are configured to provide an integrated control solution for this hybrid HVAC system. Smart AC controllers 211, 251 have functionality as described above in FIG. 1 for smart AC controllers 122. Smart sensor 231 has same functionality as described above in FIG. 1 for sensors 123. Smart thermostat 241 has functionality as described above in FIG. 1 for smart thermostats 121. Mobile device 221 has functionality as described above in FIG. 1 for mobile device 140. HVAC systems 242, 214, 254 have functionality as described above in FIG. 1 for HVAC systems 130. Cloud-based control platform 260 has functionality as described above in FIG. 1 for cloud-based control platform 110.

Room 1 210 has a smart AC controller #1 211 installed which is configured to communicate with other smart devices 120 in the home 200 either directly or via wireless router 212, and optionally with mobile device 221 also either directly or via wireless router. Smart AC controller #1 211 is further configured to control a first ductless HVAC device (a mini-split) comprising an internal unit 212 having a fan and heating/cooling exchange coils and an external heat pump 213 also having heating/cooling exchange coils.

Room 2 220 has a mobile device 221 (which may be located anywhere, as it is mobile) and a wireless router 212 configured to act as a wireless router for all wireless devices in the home 200 including smart devices 211, 231, 241, 251, and mobile device 221. [0067] smart AC controller #2 212 Room 3 230 has a smart sensor 231 which can detect motion or temperature and humidity and report back to other devices in the integrated control solution and to cloud-based control platform 260.

Room 4 240 has a smart thermostat 241 installed which is configured to communicate with other smart devices 120 in the home 200 either directly or via wireless router 212, and optionally with mobile device 221 also either directly or via wireless router. Smart thermostat 241 is further configured to control a central (ducted) HVAC device comprising with ducting to each of the four rooms, but not the garage.

Garage 250 has a smart AC controller #2 251 installed which is configured to communicate with other smart devices 120 in the home 200 either directly or via wireless router 212, and optionally with mobile device 221 also either directly or via wireless router. Smart AC controller #2 251 is further configured to control a second ductless HVAC device 254 (a mini-split) comprising an internal unit 252 having a fan and heating/cooling exchange coils and an external heat pump 253 also having heating/cooling exchange coils.

Mobile device 221 is used to program integrated control solution by establishing links between smart devices 211, 231, 241, 251 and/or cloud-based control platform 260, action conditions for each link, and actions to be taken by linked smart devices 211, 231, 241, 251, when action conditions occur. Examples of programming for this exemplary hybrid HVAC system are described below. The examples described below are not intended to be limiting, and many other variations of such programming are possible.

Figure 3:
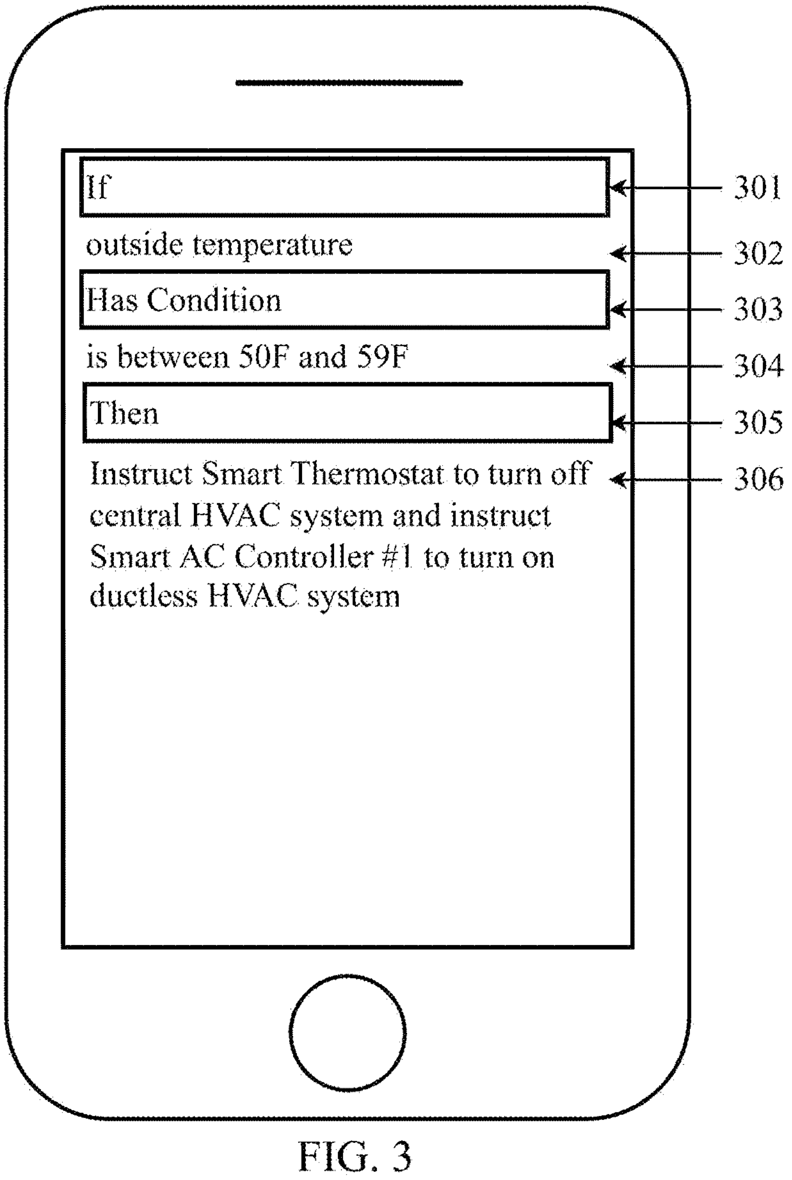
FIG. 3 is an exemplary configuration of a software application for integrated control of a hybrid HVAC system based on weather conditions.

FIG. 3 is an exemplary configuration of a software application for integrated control of a hybrid HVAC system based on weather conditions. Links, activation conditions, and actions are programmed using a graphical user interface (GUI) on mobile device 221. Here, a link is established between cloud-based control system 260, smart AC controller #1 211, and smart thermostat 241 in the form of an "if-then" statement. The "if" portion of the statement 301 has a selectable data source 302 (in this case an outside temperature available via the Internet from cloud-based control system 260). The activation condition 303 portion of the statement has a condition that the outside temperature must be in the range of "x," here 50 F to "y," here 59 F. The "then" portion of the statement 305 contains the action to be performed 306 in the event of occurrence of the activation condition, which is that smart thermostat 241 will be instructed to turn off central HVAC system 242 and smart AC controller #1 211 will be instructed to turn on first ductless HVAC system 214.

This programming would be useful, for example, where the user wants to use the lower-powered first ductless HVAC system 214 in moderate weather conditions to keep Room 1 210 cool while not cooling the entire house. Since Room 1 210 is on the upper floor of the sunny side of house 200, it tends to get hot in moderate weather even while the rest of the house stays cool. Therefore, operating central HVAC system 240 in such circumstances would be a waste of energy, and operating only first ductless HVAC system 214 is more efficient. When the outside temperature falls outside of the activation condition 303 range, a different rule may be employed (e.g., the central HVAC system 242 may be turned on, or both the central HVAC system 242 and the first ductless HVAC system 214 may be turned on).

Figure 4:
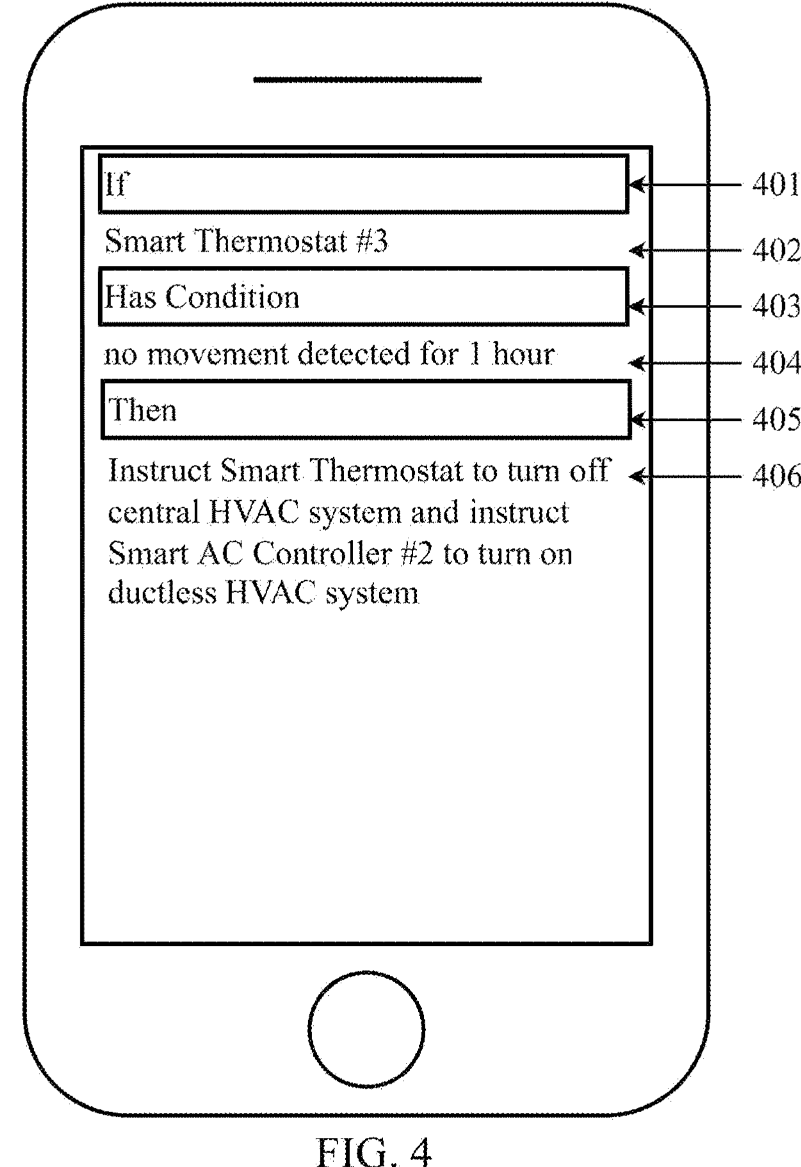
FIG. 4 is an exemplary configuration of a software application for integrated control of a hybrid HVAC system based on motion detection.

FIG. 4 is an exemplary configuration of a software application for integrated control of a hybrid HVAC system based on motion detection. Links, activation conditions, and actions are programmed using a graphical user interface (GUI) on mobile device 221. Here, a link is established between smart thermostat 241 and smart AC controller #2 251 in the form of an "if-then" statement. The "if" portion of the statement 401 has a selectable data source 402 (in this case smart thermostat 241). The activation condition 403 portion of the statement has a condition that no movement be detected for one hour 404 (wherein each smart thermostat has a motion detector integrated into it; alternately, motion detectors from home's 200 security system could be used). The "then" portion of the statement 405 contains the action to be performed 406 in the event of occurrence of the activation condition 403, which is that smart thermostat 241 will be instructed to turn off central HVAC system 242 and smart AC controller #2 251 will be instructed to turn on second ductless HVAC system 254.

This programming would be useful, for example, where the user is working in the garage and wants to use the lower-powered second ductless HVAC system 254 in moderate weather conditions to keep garage 250 cool while not cooling the entire house. Operating central HVAC system 240 in such circumstances would be a waste of energy, and operating only second ductless HVAC system 214 is more efficient. User does not want to manually keep changing operation of central HVAC system 240 and second ductless HVAC system 214, so programs the integrated control solution to automate this process.

Figures 5, 6:
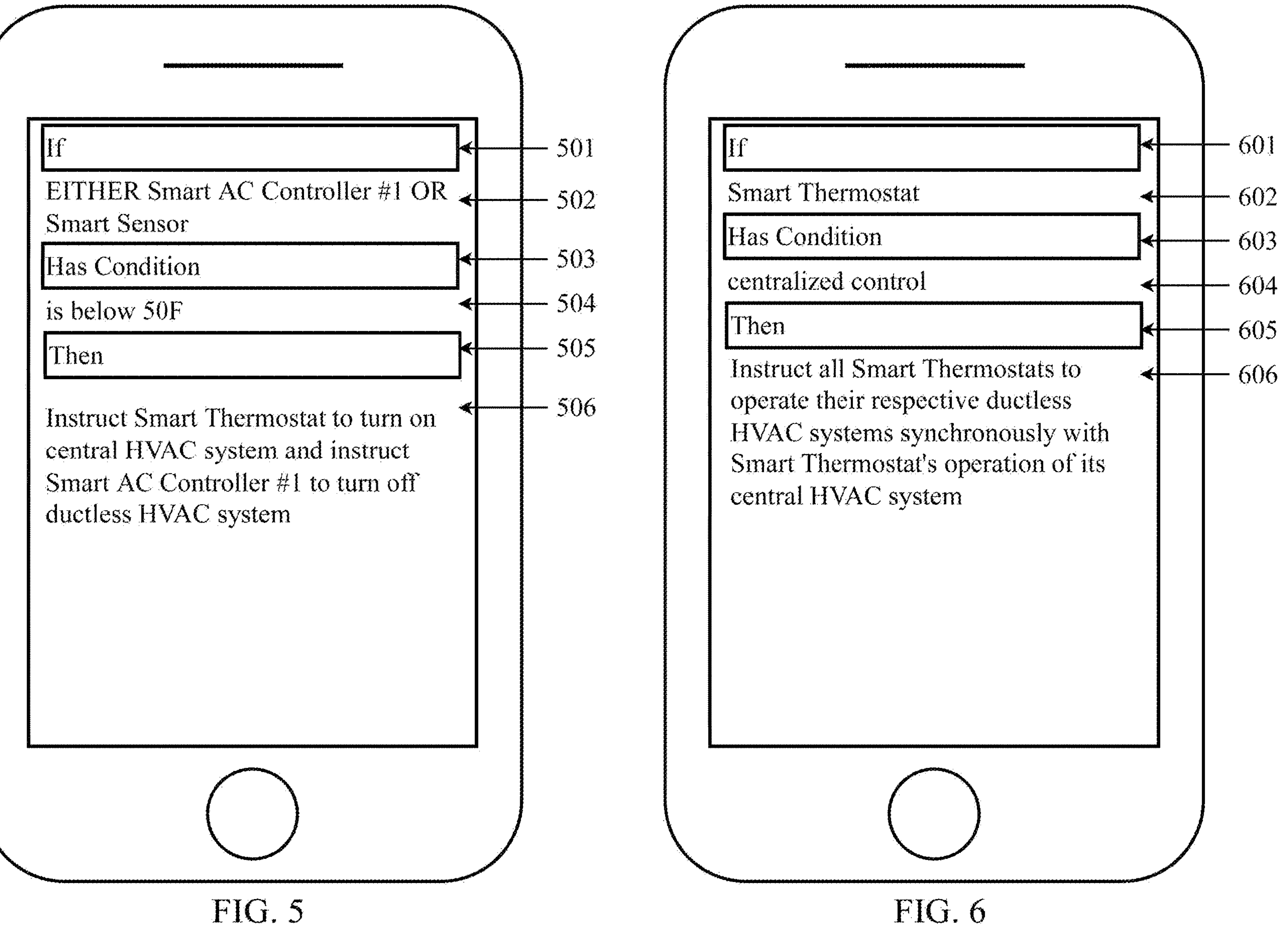
FIG. 5 is an exemplary configuration of a software application for integrated control of a hybrid HVAC system based on room temperature.
FIG. 6 is an exemplary configuration of a software application for integrated control of a hybrid HVAC system based on a centralized control setting.

FIG. 5 is an exemplary configuration of a software application for integrated control of a hybrid HVAC system based on room temperature. Links, activation conditions, and actions are programmed using a graphical user interface (GUI) on mobile device 221. Here, a link is established between smart AC controller #1 211, smart sensor 231, and smart thermostat 241 in the form of an "if-then" statement. The "if" portion of the statement 501 has a selectable data source 502 (in this case both smart AC controller #1 211 and smart sensor 231). The activation condition 503 portion of the statement has a condition wherein if either of the two smart thermostats falls below "x," here 50 F the activation condition is triggered 504. The "then" portion of the statement 505 contains the action to be performed 506 in the event of occurrence of the activation condition 503, which is that smart thermostat 241 will be instructed to turn on central HVAC system 242 and smart AC controller #1 211 will be instructed to turn off first ductless HVAC system 214.

This programming would be useful, for example, where the lower-powered first ductless HVAC system 214 is insufficient to heat or cool the entire house. While smart AC controller #1 211 may indicate that Room 1 temperature is fine, smart sensor 231 indicates that other parts of home 200 are not getting sufficient heat. Thus, as first ductless HVAC system 214 is underpowered for the task at hand, central HVAC system 242 must be used to heat home 200.

FIG. 6 is an exemplary configuration of a software application for integrated control of a hybrid HVAC system based on a centralized control setting. Links, activation conditions, and actions are programmed using a graphical user interface (GUI) on mobile device 221. Here, a link is established between smart thermostat 241 and all other smart thermostats in the form of an "if-then" statement. The "if" portion of the statement 601 has a selectable data source 602 (in this case smart thermostat 241). The activation condition 603 portion of the statement has a condition wherein if the centralized control command is activated (e.g., by mobile phone 221 via cloud-based control platform 260), the activation condition is triggered 604. The "then" portion of the statement 605 contains the action to be performed 606 in the event of occurrence of the activation condition 503, which is that all other smart devices 211, 251 will be instructed to operate synchronously with smart thermostat 241's operation of central HVAC system 242. As an example, if smart thermostat 241 causes central HVAC system 242 to heat for 20 minutes, all other smart devices 211, 251 will cause their HVAC devices 214, 254 to heat for 20 minutes.

This programming would be useful, for example, where home 200 (or some other building) has a central unit installed, but the central unit is unable to achieve the desired room temperature in certain rooms due to inadequate capacity or poor ducting.

This programming would also be useful, for example, in an office building where the HVAC units need to be powered on in the morning at some time and powered off in the evening. This programming can be further enhanced through use of activation conditions related to scheduling, such as turning on all HVAC devices in the morning around 8:45 AM and turning them all off in the evening at 6:30 PM.

Figure 7:
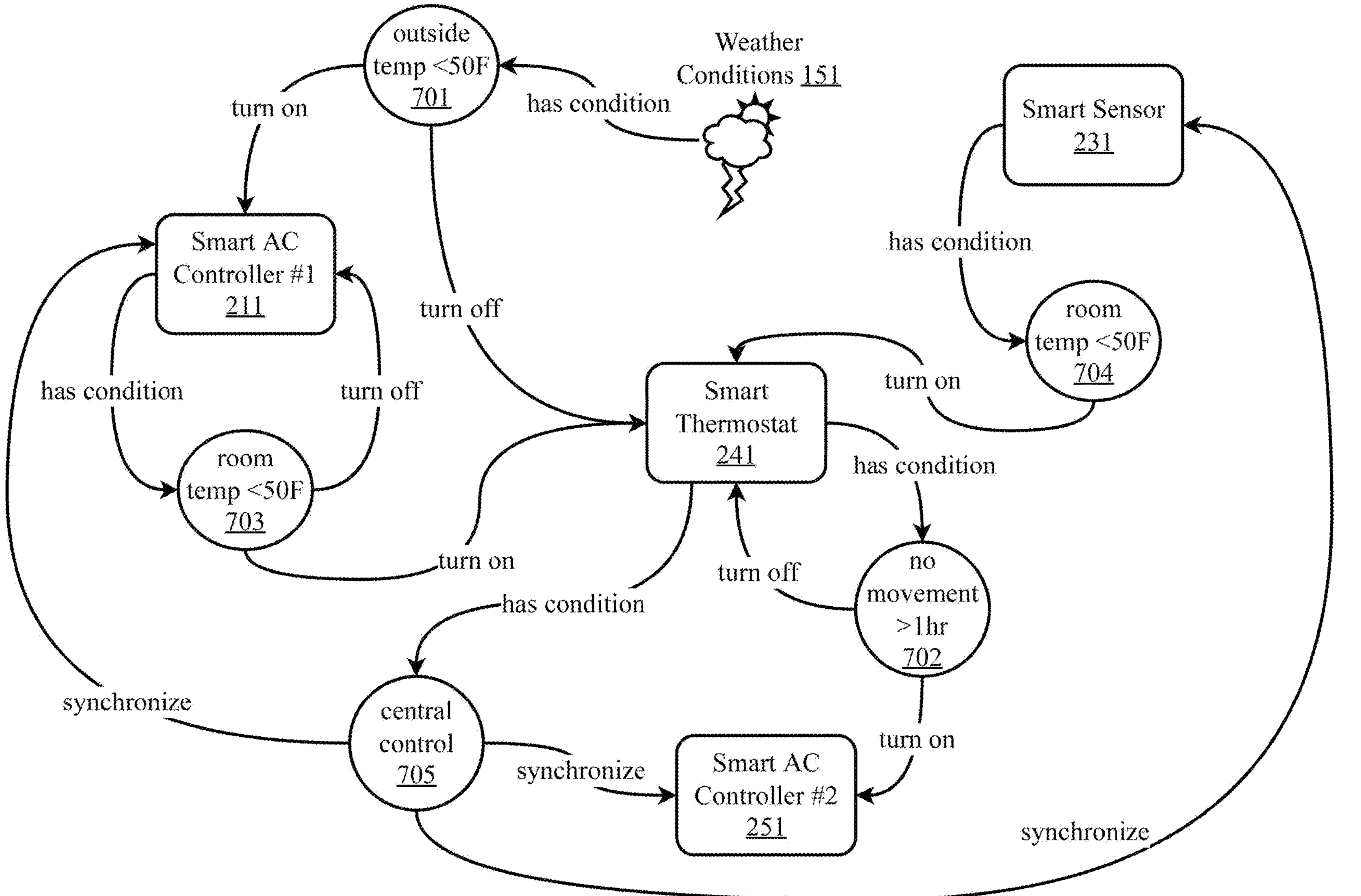
FIG. 7 is an exemplary knowledge graph illustrating complex control of a hybrid HVAC system.

FIG. 7 is an exemplary knowledge graph illustrating complex control of a hybrid HVAC system. This knowledge graph combines the programming of FIGS. 3-6 into a set of operating conditions, and shows how complex operations can be programmed into the integrated control solution. Here, the four smart devices 221, 231, 241, 251 of home 200 are represented as entity nodes of the knowledge graph, along with an entity node for an external condition (weather conditions 151) and several condition nodes representing activation conditions 701-705. Edges of the graph are labeled either as "has condition" or with an action to take in the event that the condition is true (i.e., turn on, turn off, synchronize). As the state of each entity node changes (i.e., as one or more of the activation conditions changes), the operation of the integrated control solution changes according to the action to be taken for that entity and condition. Thus, complex sets of automated operations can be programmed into the integrated control solution.

Here, consistent with the "if-then" statement of FIG. 3, if external weather condition 151 node has the condition that the outside temperature is less than "x," here, 50 F 701, then smart AC controller #1 211 is instructed to turn on its HVAC unit and smart thermostat 241 is instructed to turn off its HVAC system 242. Consistent with the "if-then" statement of FIG. 4, if smart thermostat 241 node has the condition that no movement is detected for greater than one hour 702, then smart thermostat 241 is instructed to turn off its HVAC system 242 and smart AC controller #2 251 is instructed to turn on its HVAC unit 254. Consistent with the "if-then" statement of FIG. 5, if either smart AC controller #1 211 node or smart sensor 231 node has the condition that its respective room temperature is less than "x," here, 50 F 703, 704, then smart thermostat 241 is instructed to turn on its HVAC system 242 and smart AC controller #1 211 is instructed to turn on its HVAC unit 214 smart AC controller #2. Consistent with the "if-then" statement of FIG. 6, if smart thermostat 241 node has the condition that it has been set to central control mode 705, then all other smart AC controllers 211, 251, are instructed to synchronize control of their respective HVAC devices with smart thermostat's 241 control of its HVAC device.

These statements can be programmed to operate in parallel with one another with no priority (i.e., any change in condition can override the actions previously taken by a different change in condition), or can be programmed with priorities, such that more critical changes in condition take precedence over less critical changes. For example, the central control 705 condition could be programmed to take priority over other changes in condition such as weather conditions 151. Programming with priorities is particularly useful in situations where a conflict may occur (e.g., a smart thermostat is instructed at the same time to turn on its HVAC device based on one condition and to turn off its HVAC device based on another condition). Priorities may be assigned manually, or may be pre-programmed based on certain modes (e.g., central control mode 705 takes priority over all other conditions). Conflict checks (i.e., simultaneous conflicting instructions to the same smart thermostat) can be performed automatically, and a resolution may be assigned manually, or may be pre-programmed based on certain modes.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a wireless/network interface card or on a cloud service.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple wireless/network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 8:
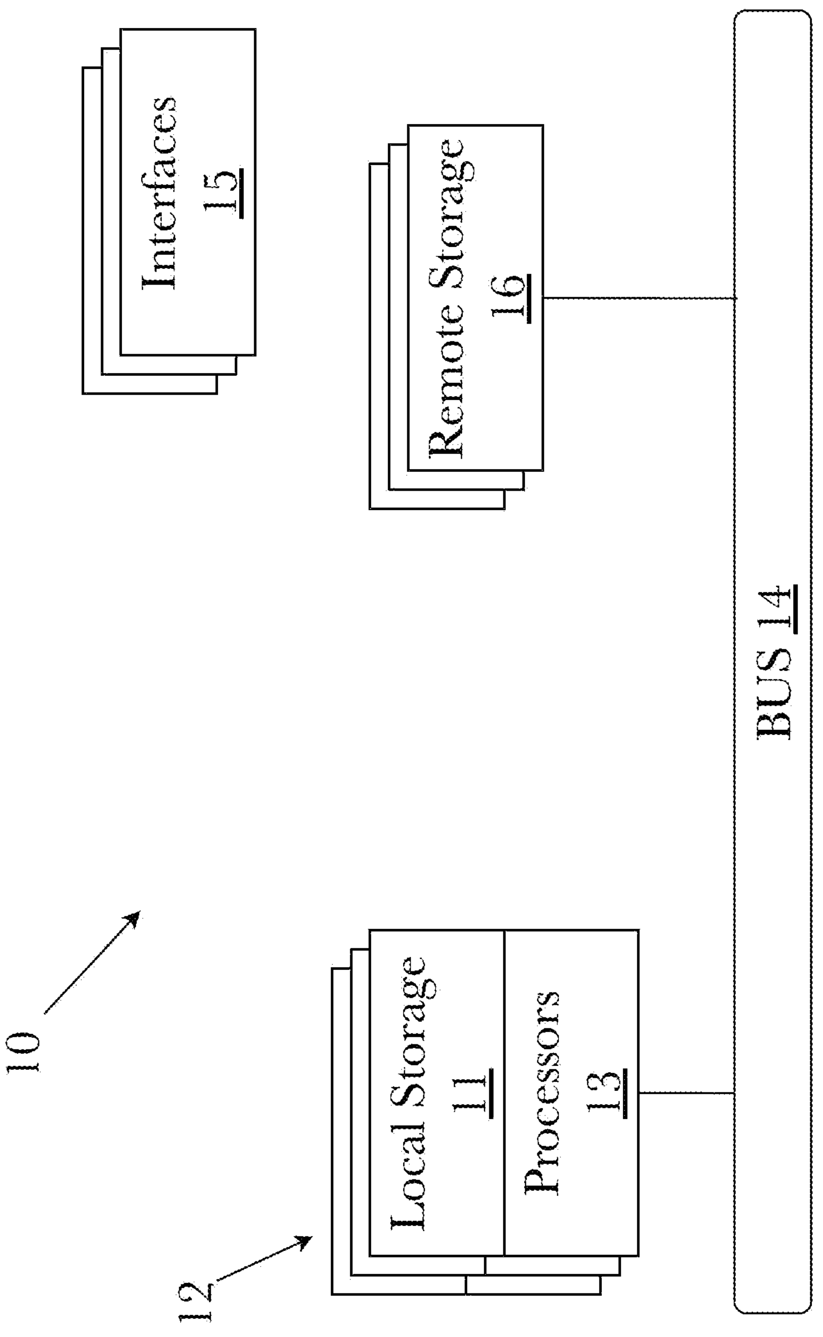
FIG. 8 is a block diagram illustrating an exemplary hardware architecture of a computing device.

Referring now to FIG. 8, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™ THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 8 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 9:
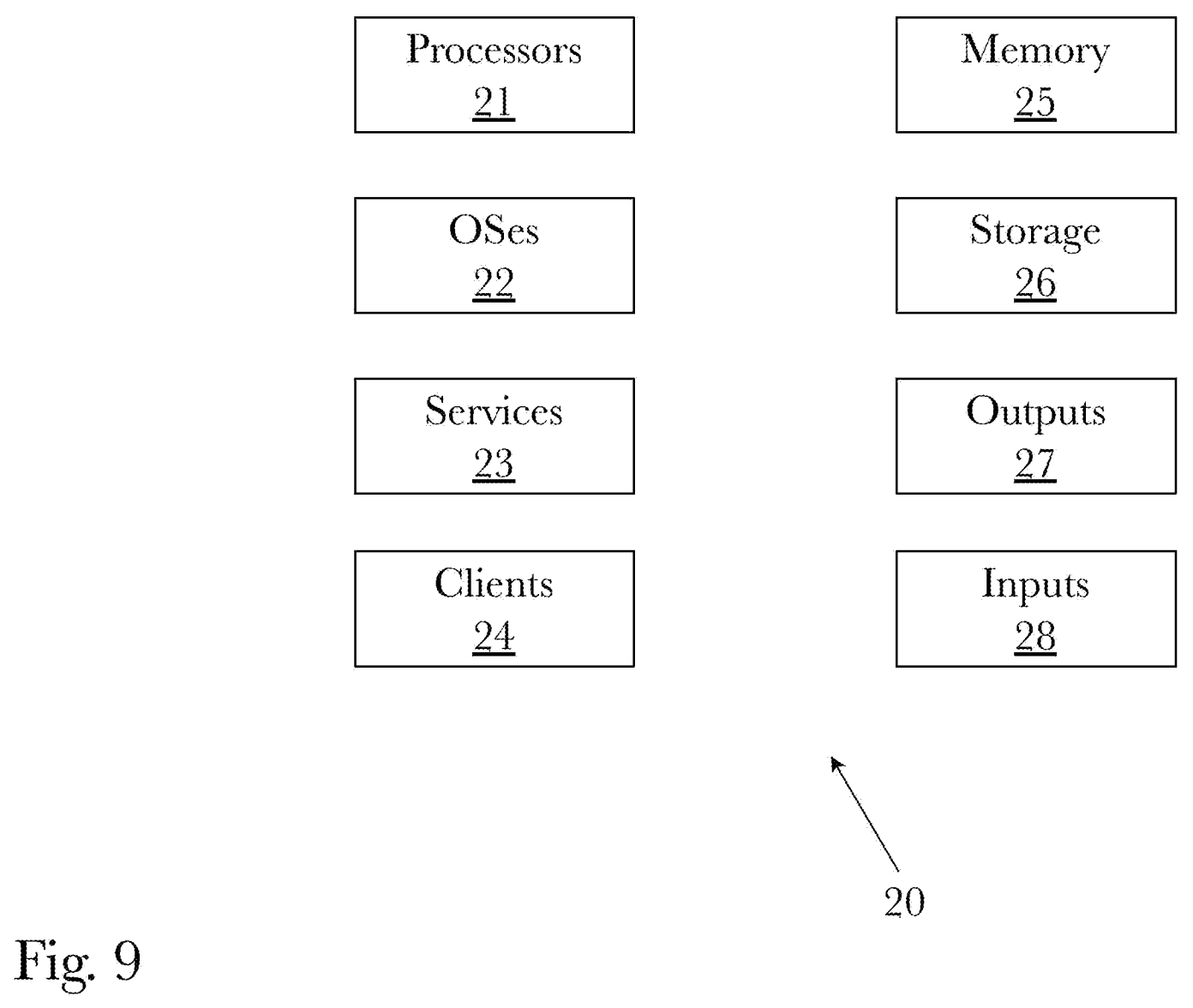

In some aspects, systems may be implemented on a standalone computing system. Referring now to FIG. 9, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 8). Examples of storage devices 26 include flash memory, magnetic hard drive, CD-ROM, and/or the like.

Figure 10:
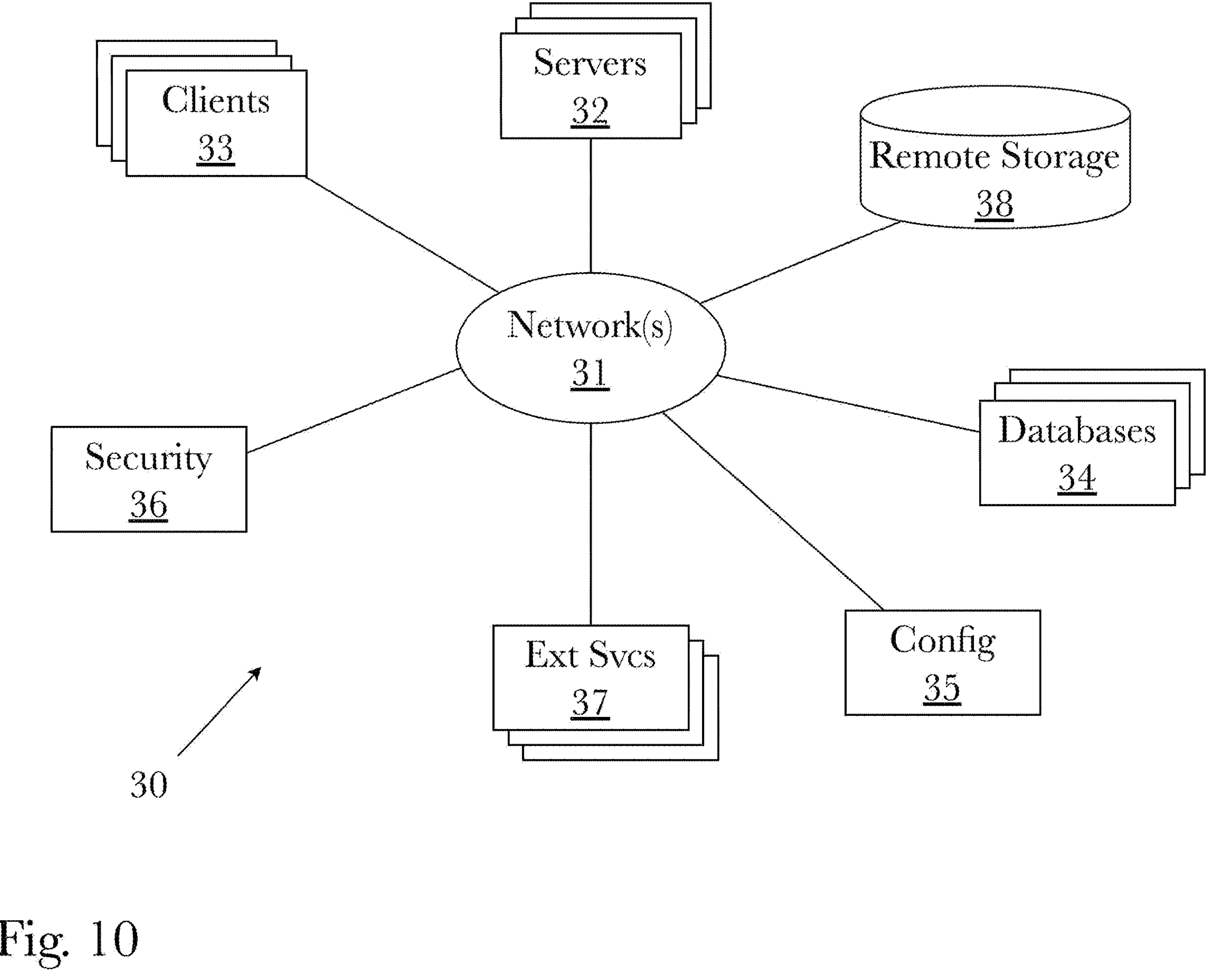
FIG. 10 is a block diagram showing an exemplary architectural arrangement of clients, servers, and external services.

In some aspects, systems may be implemented on a distributed computing network, such as one having any number of clients and/or servers. Referring now to FIG. 10, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 9. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises. In addition to local storage on servers 32, remote storage 38 may be accessible through the network(s) 31.

In some aspects, clients 33 or servers 32 (or both) may make use of one or more specialized services or appliances that may be deployed locally or remotely across one or more networks 31. For example, one or more databases 34 in either local or remote storage 38 may be used or referred to by one or more aspects. It should be understood by one having ordinary skill in the art that databases in storage 34 may be arranged in a wide variety of architectures and using a wide variety of data access and manipulation means. For example, in various aspects one or more databases in storage 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 11:
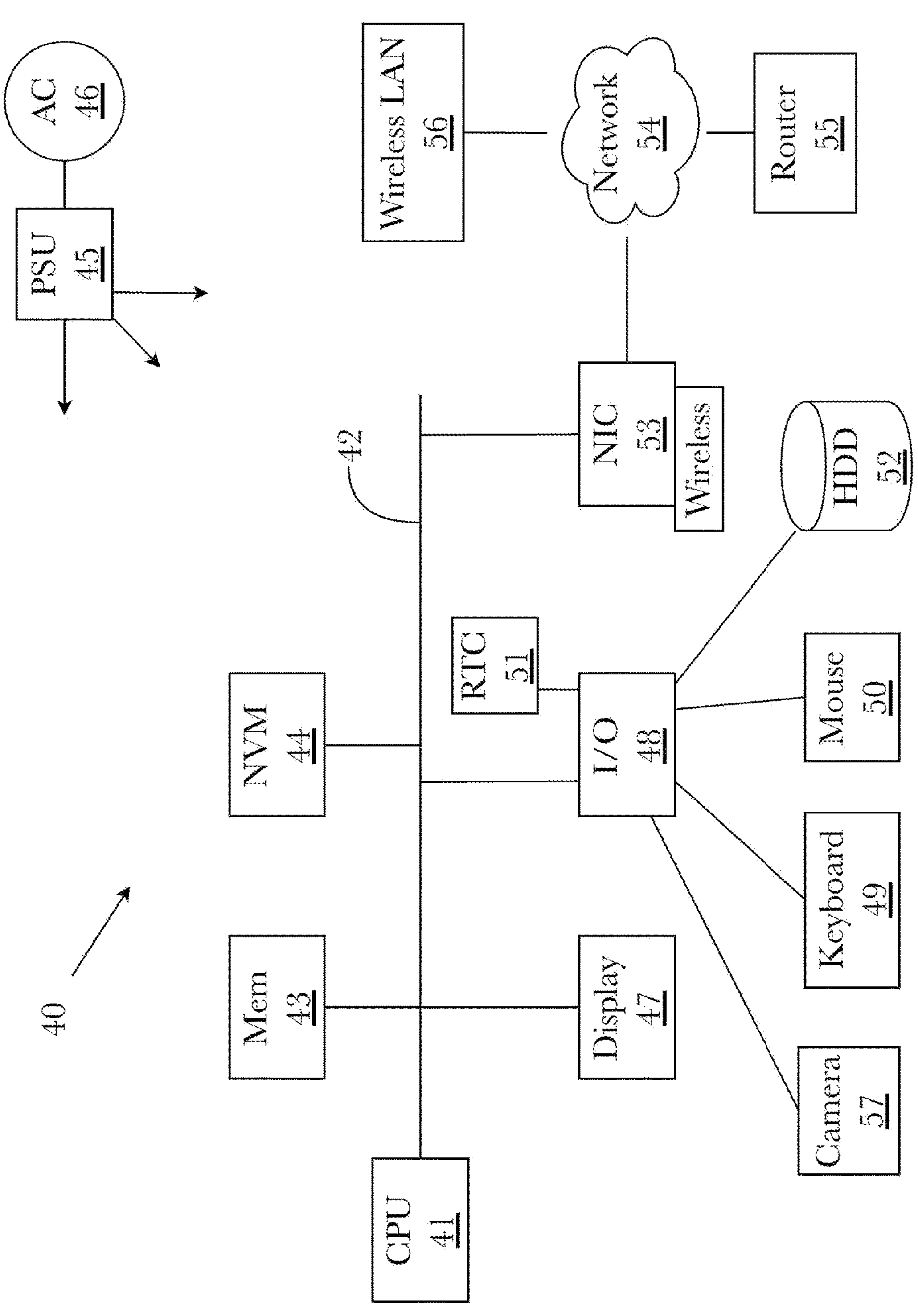
FIG. 11 is another block diagram illustrating an exemplary hardware architecture of a computing device.

FIG. 11 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to peripherals such as a keyboard 49, pointing device 50, hard disk 52, real-time clock 51, a camera 57, and other peripheral devices. NIC 53 connects to network 54, which may be the Internet or a local network, which local network may or may not have connections to the Internet. The system may be connected to other computing devices through the network via a router 55, wireless local area network 56, or any other network connection. Also shown as part of system is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for controlling a hybrid heating, ventilation, and air conditioning (HVAC) system comprising a ducted HVAC unit and a ductless HVAC unit, the system comprising:

a plurality of smart devices, each comprising a memory, a processor, and a network interface;

a software application comprising a plurality of programming instructions stored in the memories of, and operating on the processors of, each smart device which:

causes a first smart device of the plurality of smart devices to:

receive, via the network interface, an activation condition and an action to be taken by a second smart device of the plurality of smart devices upon occurrence of the activation condition;

store the activation condition and action in its memory;

monitor for occurrence of the activation condition and, upon detection of the occurrence of the activation condition, send, via the network interface, instructions for the second smart device to take the action; and causes the second smart device of the plurality of smart devices to:

receive, via the network interface, instructions from the first smart device to take the action; and take the action instructed by the first smart device, wherein the first smart device comprises a thermostat that controls the ducted HVAC unit, wherein the second smart device comprises a controller that controls the ductless HVAC unit, wherein the action changes an operating state of the ductless HVAC unit.

2. The system of claim 1, wherein the first smart device and second smart device are directly connected via their respective network interfaces, and wherein the instructions for the second smart device to take the action are sent directly between the two devices via the direct connection.

3. The system of claim 1, wherein the first smart device and second smart device are connected via their respective network interfaces to the Internet, and wherein the instructions for the second smart device to take the action are sent between the two devices via the Internet.

4. The system of claim 1, further comprising a cloud-based control platform accessible via the Internet, wherein:

the first smart device and second smart device each have a connection, via their respective network interfaces, to the cloud-based control platform via the Internet;

the cloud-based control platform transmits to the first device, via the Internet, the activation condition and the action to be taken by the second smart device;

the first smart device, upon detection of the occurrence of the activation condition sends to the cloud-based control platform the instructions for the second smart device to take the action; and the cloud-based control platform sends to the second smart device the instructions for the second smart device to take the action.

5. The system of claim 1, wherein the software application further comprises a second action to be taken by the first smart device which has detected the occurrence of the activation condition, and wherein the first smart device takes the second action.

6. The system of claim 1, wherein the first smart device receives, via its network interface, the activation condition and action from a mobile computing device.

7. The system of claim 1, wherein the first smart device receives, via its network interface, the activation condition and action from the Internet.

8. The system of claim 7, wherein the first smart device receives, via its network interface, the activation condition and action from a cloud-based control platform accessible via the Internet.

9. A method for controlling a hybrid heating, ventilation, and air conditioning (HVAC) system comprising a ducted HVAC unit and a ductless HVAC unit, the method comprising:

operating a plurality of smart devices, each comprising a memory, a processor, and a network interface;

using a software application comprising a plurality of programming instructions stored in the memories of, and operating on the processors of, each smart device to perform:

causing a first smart device of the plurality of smart devices to:

receive, via the network interface, an activation condition and an action to be taken by a second smart device of the plurality of smart devices upon occurrence of the activation condition;

store the activation condition and action in its memory;

monitor for occurrence of the activation condition and, upon detection of the occurrence of the activation condition, send, via the network interface, instructions for the second smart device to take the action; and causing the second smart device of the plurality of smart devices to:

receive, via the network interface, instructions from the first smart device to take the action; and take the action instructed by the first smart device, wherein the first smart device comprises a thermostat that controls the ducted HVAC unit, wherein the second smart device comprises a controller that controls the ductless HVAC unit, wherein the action changes an operating state of the ductless HVAC unit.

10. The method of claim 9, wherein the first smart device and second smart device are directly connected via their respective network interfaces, and wherein the instructions for the second smart device to take the action are sent directly between the two devices via the direct connection.

11. The method of claim 9, wherein the first smart device and second smart device are connected via their respective network interfaces to the Internet, and wherein the instructions for the second smart device to take the action are sent between the two devices via the Internet.

12. The method of claim 9, further comprising using a cloud-based control platform accessible via the Internet to perform:

connecting the first smart device and second smart device, via their respective network interfaces, to the cloud-based control platform via the Internet;

transmitting from the cloud-based control platform to the first device, via the Internet, the activation condition and the action to be taken by the second smart device;

sending from the first smart device, upon its detection of the occurrence of the activation condition, to the cloud-based control platform the instructions for the second smart device to take the action; and sending from the cloud-based control platform to the second smart device the instructions for the second smart device to take the action.

13. The method of claim 9, further comprising receiving, at the software application, a second action to be taken by the first smart device which has detected the occurrence of the activation condition, and instructing the first smart device to take the second action upon occurrence of the activation condition.

14. The method of claim 9, wherein the first smart device receives, via its network interface, the activation condition and action from a mobile computing device.

15. The method of claim 9, wherein the first smart device receives, via its network interface, the activation condition and action from the Internet.

16. The method of claim 15, wherein the first smart device receives, via its network interface, the activation condition and action from a cloud-based control platform accessible via the Internet.

* * * * *